(12) United States Patent
Huang

(10) Patent No.: US 9,987,777 B2
(45) Date of Patent: Jun. 5, 2018

(54) POWER INDUCTOR ENCAPSULATED THROUGH INJECTION MOLDING

(71) Applicant: Magsonder Innovation(Shanghai) Co., Ltd., Shanghai (CN)

(72) Inventor: Zhi Huang, Shanghai (CN)

( * ) Notice: Subject to any disclaimer, the term of this patent is extended or adjusted under 35 U.S.C. 154(b) by 0 days. days.

(21) Appl. No.: 15/706,696

(22) Filed: Sep. 16, 2017

(65) Prior Publication Data

US 2018/0001523 A1    Jan. 4, 2018

Related U.S. Application Data

(63) Continuation of application No. PCT/CN2016/078288, filed on Apr. 1, 2016.

(30) Foreign Application Priority Data

Apr. 17, 2015    (CN) .......................... 2015 1 0185528

(51) Int. Cl.
| | |
|---|---|
| *H01F 5/00* | (2006.01) |
| *B29C 45/00* | (2006.01) |
| *H02J 50/10* | (2016.01) |
| *H01F 27/29* | (2006.01) |

(52) U.S. Cl.
CPC ............... *B29C 45/00* (2013.01); *H01F 5/00* (2013.01); *H01F 27/29* (2013.01); *H02J 50/10* (2016.02)

(58) Field of Classification Search
CPC ........................ H01F 5/00; H01F 27/00–27/36
USPC ..... 336/65, 83, 90, 192, 196, 198, 200, 212, 336/220–223, 233–234
See application file for complete search history.

(56) References Cited

U.S. PATENT DOCUMENTS

| | | | | |
|---|---|---|---|---|
| 4,760,366 A | * | 7/1988 | Mitsui ..................... | H01F 17/04 336/198 |
| 6,696,913 B2 | * | 2/2004 | Meuche .................... | H01F 3/08 336/208 |
| 7,233,225 B2 | * | 6/2007 | Sato ....................... | H01F 27/255 336/200 |

(Continued)

FOREIGN PATENT DOCUMENTS

| | | |
|---|---|---|
| CN | 101527197 A | 9/2009 |
| CN | 101789303 A | 7/2010 |

(Continued)

*Primary Examiner* — Tuyen Nguyen
(74) *Attorney, Agent, or Firm* — Wayne & Ken, LLC; Tony Hom

(57) ABSTRACT

The present invention discloses a power inductor encapsulated through injection molding. The power inductor comprises a coil winding, a soft magnetic ferrite middle column inserted in a middle of the coil winding, and a magnetic powder glue for encapsulating the coil winding and the soft magnetic ferrite middle column through injection molding. The power inductor is square and meets L≥W and 2rc>0.4× 2W, wherein a section width of the soft magnetic ferrite middle column perpendicular to a height direction of the inductor is 2rc, a length of the power inductor is 2L, and a width of the power inductor is 2W. According to the present invention, a balanced direct-current resistance and a direct-current superposition saturation characteristic can be obtained, and the direct-current resistance is greatly decreased while an excellent direct-current superposition saturation characteristic is ensured.

8 Claims, 14 Drawing Sheets

(56) References Cited

U.S. PATENT DOCUMENTS

| | | | | |
|---|---|---|---|---|
| 8,120,458 | B2 * | 2/2012 | Iwakura | H01F 27/325 336/198 |
| 9,754,713 | B2 * | 9/2017 | Wu | H01F 3/08 |
| 2006/0244561 | A1 * | 11/2006 | Iwakura | H01F 27/255 336/212 |
| 2013/0307655 | A1 * | 11/2013 | Saito | H01F 17/043 336/83 |

FOREIGN PATENT DOCUMENTS

| | | |
|---|---|---|
| CN | 101944416 A | 1/2011 |
| CN | 102856037 A | 1/2013 |

* cited by examiner

| | Dimension ($2L \cdot 2W \cdot H$) | $r_c$ (mm) | $h_c$ (mm) | L (uH) | $I_{sat}$ (A) | DCR (mΩ) |
|---|---|---|---|---|---|---|
| I-shaped magnetic glue NR6045-100M | 6.0*6.0*4.5 | / | / | 10 | 3.9 | 47 |
| Embodiment 1 | 6.0*6.0*4.5 | 1.3 | 3.8 | 10 | 5 | 37.5 |

FIG.11

| Sample | | Characteristic Dimension $(2L \cdot 2W \cdot H)$ | L (uH) | $I_{sat}$ (A) | DCR (mΩ) | $r_c$ (mm) | $h_c$ (mm) | $r_c >$ 0.4W | $h_c >$ H/2 | $h_c >$ $H - 2r_c/3$ |
|---|---|---|---|---|---|---|---|---|---|---|
| Mold-pressing inductor | | 7*6.6*3 | 10 | 5.5 | 68 | / | / | / | / | / |
| Embodiment | 2-1 | 7*6.6*3 | 10 | 5.7 | 60.5 | 1.6 | 1.95 | √ | √ | √ |
| | 2-2 | 7*6.6*3 | 10 | 5.9 | 58.2 | 1.5 | 2.21 | √ | √ | √ |
| Reference embodiment | 2-1 | 7*6.6*3 | 10 | 4.5 | 55 | 1.2 | 2.29 | × | √ | √ |
| | 2-2 | 7*6.6*3 | 10 | 5 | 60 | 1.5 | 1.85 | √ | √ | × |
| | 2-3 | 7*6.6*3 | 10 | 5.2 | 80 | 1.7 | 1.45 | √ | × | × |
| | 2-4 | 7*6.6*3 | 10 | 3.5 | 53 | 1.1 | 2 | × | √ | × |

FIG.12

|  | Dimension (2L·2W·H) | $r_c$ (mm) | $h_c$ (mm) | L (uH) | $I_{sat}$ (A) | DCR (mΩ) |
|---|---|---|---|---|---|---|
| Mold-pressing inductor MPI4442-2R2 | 4.4*4.2*1.2 | / | / | 2.2 | 5.3 | 79.5 |
| I-shaped magnetic glue NR4012-2R2 | 4.0*4.0*1.2 | / | / | 2.2 | 2 | 92 |
| Embodiment 3 | 4.4*4.2*1.2 | 0.9 | 0.73 | 2.2 | 5.6 | 64 |

FIG.13

POWER INDUCTOR ENCAPSULATED THROUGH INJECTION MOLDING

TECHNICAL FIELD

The present invention relates to a power inductor, and more specifically, to a power inductor encapsulated through injection molding having low direct-current resistance and high direct-current saturation characteristics through mixed design by using different materials.

BACKGROUND

Through years of development of an existing power inductor, an assembly type inductor slowly tends to be marginalized due to difficulty in realization of automation, while two types can basically realize the automation as follows: the first type is an integrally molded mold-pressing inductor which is made by mixing and granulating metal powder and resin and then performing mold pressing with a coil through a metal mold. Due to extremely high saturated magnetic flux density of the metal powder in the inductor, an excellent direct-current saturation characteristic can be obtained, as shown in FIG. 1(1). The other type of inductor is obtained by adopting an I-shaped ferrite magnetic core, directly winding a coil on the magnetic core and then coating an outer part by adopting magnetic glue to enclose a magnetic circuit. The I-shaped magnetic glue inductor is often called an NR inductor. Since an electrode is directly metalized on the ferrite magnetic core, the inductor is high in drop impact resistance, simple in manufacture procedure and high in degree of automation, as shown in FIG. 1(2). The two inductors are widely applied in various electronic devices such as LED illumination devices, multifunctional mobile phones, flat-panel TVs, blue ray DVDs, set top boxes, laptop computers, desktop computers, servers, display cards, portable devices, multimedia devices, etc.

However, the two inductors respectively have disadvantages through comparison. The former is not high enough in yield and has lower degree of automation than the later due to many production procedures in compression molding and a high pressure of a hydraulic press needed in mass production; and the latter often has poor direct-current saturation characteristic than the former due to the low saturated magnetic flux density of the adopted ferrite magnetic core, and since a magnetic permeability of the magnetic glue coated on the outer part is generally low, a direct-current resistance relative to the mold-pressing inductor is high.

SUMMARY

With respect to defects of the prior art, the present invention provides an inductor production method capable of reducing production procedures and manual needs, shortening flow time, greatly increasing yield and easily realizing automation. Moreover, compared with the prior art, the inductor provided by the present invention has a smaller direct-current resistance and a better direct-current saturation characteristic.

The present invention provides a power inductor encapsulated through injection molding. The power inductor comprises a coil winding, a soft magnetic ferrite middle column inserted in a middle of the coil winding, and a magnetic powder glue for encapsulating the coil winding and the soft magnetic ferrite middle column through injection molding, wherein
the power inductor is square and meets:

$L \geq W$ $2r_c > 0.4 \times 2W$ wherein a section width of the soft magnetic ferrite middle column perpendicular to a height direction of the inductor is $2r_c$, a length of the power inductor is $2L$, and a width of the power inductor is $2W$.

Preferably, the present invention provides a power inductor encapsulated through injection molding, wherein $4H/5 > h_c > H/2$, and $h_c$ is a height of the soft magnetic ferrite middle column along the height direction of the power inductor, and a height of the power inductor is H.

Preferably, the present invention provides a power inductor encapsulated through injection molding, wherein $h_c \geq H - 2r_c/3$.

Preferably, the present invention provides a power inductor encapsulated through injection molding, wherein
the soft magnetic ferrite middle column is arranged in a centrosymmetric position of the power inductor.

Preferably, the present invention provides a power inductor encapsulated through injection molding, wherein
a section shape of the soft magnetic ferrite middle column perpendicular to the height direction of the power inductor comprises a circle, a square, a rectangle and a race track.

Preferably, the present invention provides a power inductor adopting injection molding encapsulation, wherein
materials of the soft magnetic ferrite middle column comprise manganese zinc ferrite and nickel zinc ferrite.

Preferably, the present invention provides a power inductor adopting injection molding encapsulation, wherein
the magnetic powder glue is formed by mixing resin and magnetic metal powder; materials of the resin comprise epoxy resin, silicone resin and phenolic resin; and materials of the magnetic metal powder comprise carbonyl iron, iron-silicon alloy, iron-silicon-aluminum alloy, iron-silicon-chromium alloy, iron-nickel alloy, iron-nickel-molybdenum alloy and amorphous alloy.

Preferably, the present invention provides a power inductor encapsulated through injection molding, wherein
a magnetic permeability of the magnetic powder glue is more than or equal to 5 and less than or equal to 20.

Preferably, the present invention provides a power inductor encapsulated through injection molding, wherein
a winding window height $h_w$ of the coil winding is less than or equal to $h_c$.

Preferably, the present invention provides a power inductor adopting injection molding encapsulation, wherein
the power inductor may further comprise two terminal parts which are welded with the coil winding and provide electrical connection between the power inductor and an external circuit.

According to the power inductor encapsulated through injection molding with the above structure, a balanced direct-current resistance and a direct-current superposition saturation characteristic may be obtained, the direct-current resistance is greatly decreased while an excellent direct-current superposition saturation characteristic is ensured, indicating that advantages of the present invention are very obvious in case of inductance flattening.

BRIEF DESCRIPTION OF DRAWINGS

For those skilled in the art, the above and other purposes, features and advantages of the present invention will be apparent below from detailed description of the present invention with reference to drawings.

FIG. 11 is a comparison table of an electrical characteristic in embodiment 1;

FIG. 12 is a comparison table of an electrical characteristic in embodiment 2; and FIG. 13 is a comparison table of an electrical characteristic in embodiment 3.

LIST OF REFERENCE NUMERALS

Figure 1:
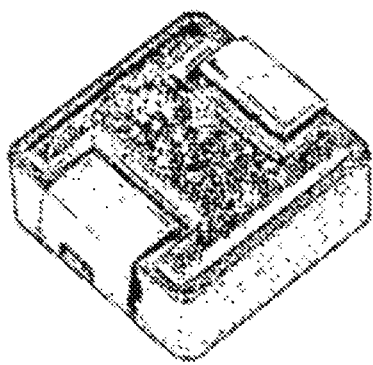
FIG. 1(1) and FIG. 1(2) are respectively a schematic diagram of a traditional mold-pressing inductor and a schematic diagram of an I-shaped magnetic glue inductor.
Figure 1:
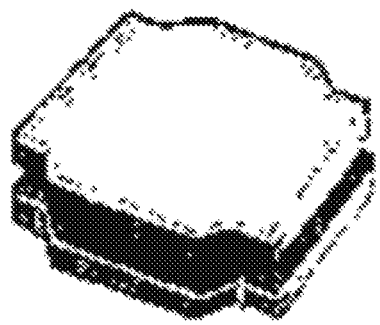

1—coil winding
2—soft magnetic ferrite middle column
3—magnetic powder glue
4a—lead frame
4—terminal part
5—nozzle
6—runner
2L—inductor length
2W—inductor width
H—inductor height
d—winding window width
$h_w$—winding window height
$r_c$—radius of soft magnetic ferrite middle column
$h_c$—height of soft magnetic ferrite middle column along a height direction of the inductor; and
h—yoke position thickness of encapsulated magnetic powder glue

DETAILED DESCRIPTION

A brief introduction is given first. The present invention relates to an inductor comprising a coil winding, a soft magnetic ferrite middle column inserted in a middle of the coil winding, and a magnetic powder glue for encapsulating the coil winding and the soft magnetic ferrite middle column by injection molding. A size of the inductor is square, and a length, a width and a height of the inductor are respectively as follows:

$$2L \cdot 2W \cdot H (L \geq W),$$

wherein a section width $2r_c$ of the soft magnetic ferrite middle column perpendicular to a height direction of the inductor needs to be more than 0.4 time that of an inductor width 2W; a height $h_c$ of the soft magnetic ferrite middle column along the height direction of the inductor needs to be more than ½ of an inductor height H and less than ⅘ of the inductor height; the height $h_c$ of the soft magnetic ferrite middle column along the height direction of the inductor needs to be not less than H−$2r_c$/3; the soft magnetic ferrite middle column should be arranged in a centrosymmetric position of the inductor; a section shape of the soft magnetic ferrite middle column perpendicular to the height direction of the inductor may be a circle, a square, a rectangle and a race track, and a width of the soft magnetic ferrite middle column is $2r_c$; materials of the soft magnetic ferrite middle column comprise manganese zinc ferrite and nickel zinc ferrite; the magnetic powder glue is formed by mixing resin and magnetic metal powder; materials of the resin comprise but not limited to epoxy resin, silicone resin, phenolic resin and the like; and materials of the magnetic metal powder comprise but not limited to carbonyl iron, iron-silicon alloy, iron-silicon-aluminum alloy, iron-silicon-chromium alloy, iron-nickel alloy, iron-nickel-molybdenum alloy, amorphous alloy, and the like. A magnetic permeability of the magnetic powder glue is not less than 5 and not more than 20. A winding window height of the coil winding is not more than the height of the soft magnetic ferrite middle column, preferably equal to the height of the ferrite middle column. The inductor may further comprise two terminal parts which are welded with the coil winding and provide electrical connection between the inductor and an external circuit.

According to an energy storage formula of the inductor:

$$L \cdot I^2 = B \cdot J \cdot K_u \cdot A_e \cdot A_w,$$

it can be seen that a magnetic flux density B and a current density J basically represent a saturation degree of the iron core and a heating degree of the winding under given energy storage conditions (an induction quantity L and a rated current I). In this case, if a filling rate $K_u$ of the winding window is a constant value, in order to achieve a better direct-current saturation characteristic and a lower direct-current resistance, a product of a sectional area Ae of the magnetic circuit and an area Aw of the window, i.e., AP=Ae·Aw, is expected to be increased as much as possible.

A magnetic permeability μ of the material determines allocation of the values B and J under a condition that the product AP is given. For example, a needed number N of turns is small if the magnetic permeability ₁1 of the material is high; then the value B is greater while the value J is smaller under a condition that the same induction quantity L and rated current I are reached; and if the magnetic permeability μ of the material is low, the value B is smaller while the value J is greater under a condition that the same induction quantity L and saturation current I are reached.

Since the inductor designed in the present invention is mainly used in the power inductor, in a general usage condition that a direct-current is high and a ripple rate is low under an application of an output filter circuit, the inductor designed in the present invention is expected to achieve a lower winding heating degree, that is, a smaller value J. Therefore, a high magnetic permeability μ of the material is expected to be obtained in the present invention. Since the present invention belongs to a mixed material and the magnetic permeability of the soft magnetic ferrite material is far higher than that of the encapsulated magnetic powder glue, an equivalent magnetic permeability of the whole inductor is determined by an equivalent magnetic circuit length Le of the encapsulated magnetic powder glue, and the smaller the Le is, the higher the equivalent magnetic permeability of the whole inductor is. If so, for the inductor design in the present invention, a greater value of Ae·Aw/Le is expected to be obtained, and then both the magnetic flux density B and the current density J can be taken into account.

Figure 2:
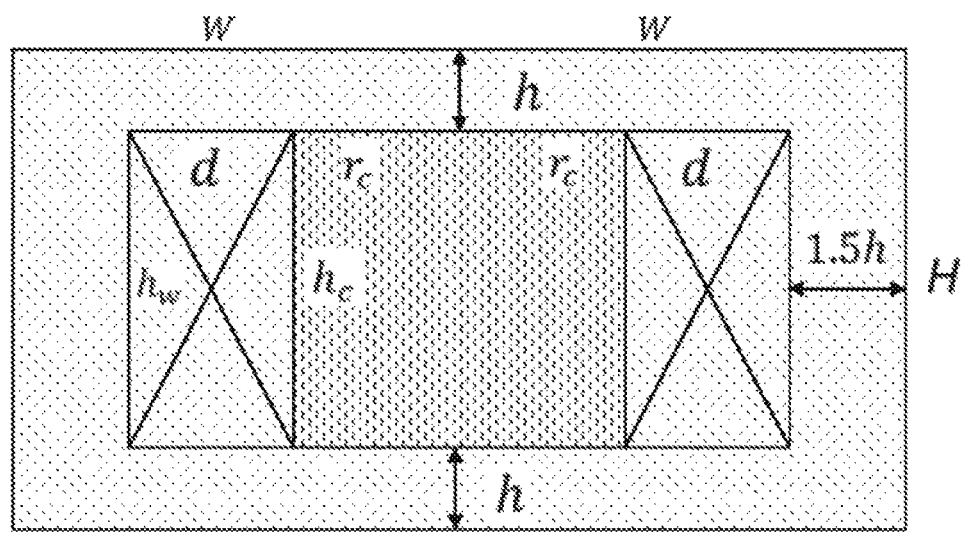
FIG. 2 is a schematic diagram of a sectional dimension of an inductor in the present invention.

FIG. 2 shows a schematic diagram of a sectional dimension of an inductor in the present invention. Assuming that a given length, width and height of the inductor are respectively as follows:

$$2L \cdot 2W \cdot H (L \geq W).$$

Since the saturation characteristic of the inductor needs to be considered in the present invention and the inductor is difficult to be saturated due to a large dimension in a length direction, the schematic diagram is a sectional dimension perpendicular to the length direction. Assuming that the soft magnetic ferrite middle column has a circular section and a radius of $r_c$, a yoke position thickness of the encapsulated magnetic powder glue is h, and an outer wall thickness of the encapsulated magnetic powder glue generally needs to consider winding terminal welding and other manufacturing procedures and is set as 1.5 h. A width of the winding window is d, and a height of the winding window is $h_w$, so a sectional area of the magnetic circuit is as follows:

$$Ae = 2\pi r_c \cdot h;$$

an area of the window is as follows:

$$Aw = d \cdot (H-2h);$$

while a length of an equivalent magnetic circuit is as follows:

$$Le = 2d + H,$$

then:

$$Ae \cdot Aw/Le = 2\pi \cdot [rc \cdot d/(2d+H)] \cdot h \cdot (H-2h)$$

A condition for obtaining a maximum value of $h \cdot (H-2h)$ is estimated as follows:

$$h = H/4.$$

However, because:

$$r_c + d = W - 1.5h,$$

the smaller the yoke position thickness h of the encapsulated magnetic powder glue is, the higher the obtained value is, and then apparently, the condition for wholly obtaining the maximum value is the yoke position thickness of the encapsulated magnetic powder glue:

$$h < H/4.$$

Figure 3:
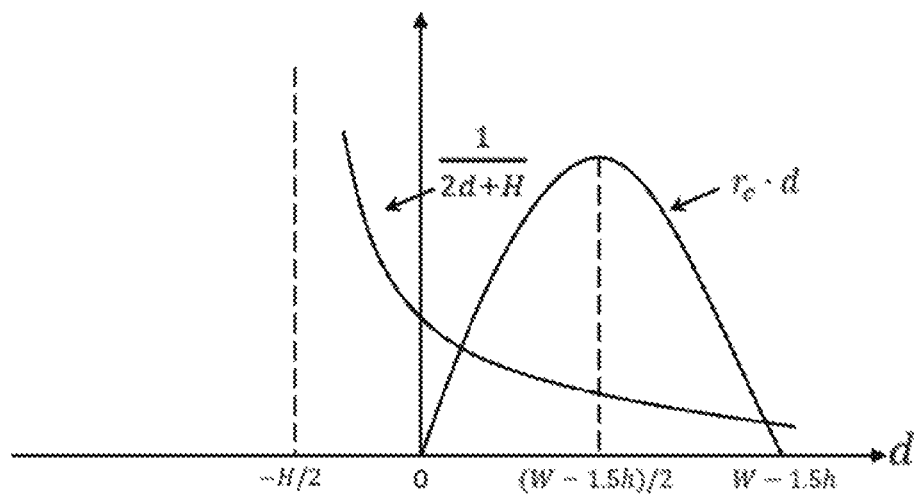
FIG. 3 is a schematic diagram of a maximum value range.

If $r_c + d = W - 1.5h$ is a constant value under a given yoke position thickness h of the encapsulated magnetic powder glue, as shown in FIG. 3, the condition for obtaining the maximum value is as follows:

$$(W - 1.5h)/2 > d,\ r_c > d.$$

Since the saturated magnetic flux density of the encapsulated magnetic powder glue is generally more than 1.5 times higher than saturated magnetic flux density of a soft magnetic ferrite material, in order to prevent the soft magnetic ferrite material from being saturated in advance during actual usage, considering continuity of the magnetic flux, the sectional area of the soft magnetic ferrite middle column needs to be increased to be more than 1.5 times that of the sectional area of the magnetic powder glue, and a condition may be met during calculation as follows:

$$r_c > 3h,$$

that is, the radius $r_c$ of the soft magnetic ferrite middle column should be more than 3 times that of the yoke position thickness of the magnetic powder glue. Several requirements mentioned above are comprehensively considered as follows:

$$r_c + d = W - 1.5h,\ r_c > d\ \text{and}\ r_c > 3h.$$

A formula is calculated as follows:

$$r_c > 2W/5,$$

that is, the radius $r_c$ of the soft magnetic ferrite middle column needs to be more than 0.4 time that of a half width W of the inductor in the inductor design. Similarly, another condition $h < H/4$ means that the height $h_c = H - 2h$ of the soft magnetic ferrite middle column in the inductor design needs to be greater than ½ of the height H of the inductor. The yoke position needs a certain thickness to prevent possible process damage, so the height of the soft magnetic ferrite middle column can not exceed ⅘ of the height H of the inductor. That is to say, $4H/5 > h_c > H/2$. Meanwhile, a condition $r_c \geq 3h$ for avoiding saturation of the soft magnetic ferrite material also means that the height of the soft magnetic ferrite middle column is as follows:

$$h_c = H - 2h \geq H - 2r_c/3.$$

The section of the soft magnetic ferrite middle column can also be a square. It can be proved that a side length of the square can correspond to an outer diameter $2r_c$ of the soft magnetic ferrite middle column, and a better characteristic may be obtained by meeting the above dimensional limit condition. For the square, assuming that the side length of the square is correspondingly $2r_c$, the sectional area of the soft magnetic ferrite middle column is as follows:

$$2r_c \cdot 2r_c,$$

while the sectional area of the magnetic powder glue can be calculated as a product of a perimeter of the soft magnetic ferrite middle column and the yoke position thickness of the magnetic powder glue, and can be expressed as follows:

$$4 \cdot 2r_c \cdot h.$$

By considering that the sectional area of the soft magnetic ferrite middle column is more than 1.5 times that of the sectional area of the magnetic powder glue, a formula can be obtained through calculation as follows:

$$r_c \geq 3h,$$

while:

$$Ae \cdot Aw/Le = 8r_c \cdot d \cdot h \cdot (H-2h)/(2d+H)$$

i.e., it can be deduced that an optimal value condition needs to satisfy $r_c > d$ and $h < H/4$; and meanwhile, the height $h_c \geq H - 2r_c/3$ of the soft magnetic ferrite middle column can be deduced. In other words, as long as the side length of the square is correspondingly $2r_c$, a related optimal value condition is still the same.

Figure 4:
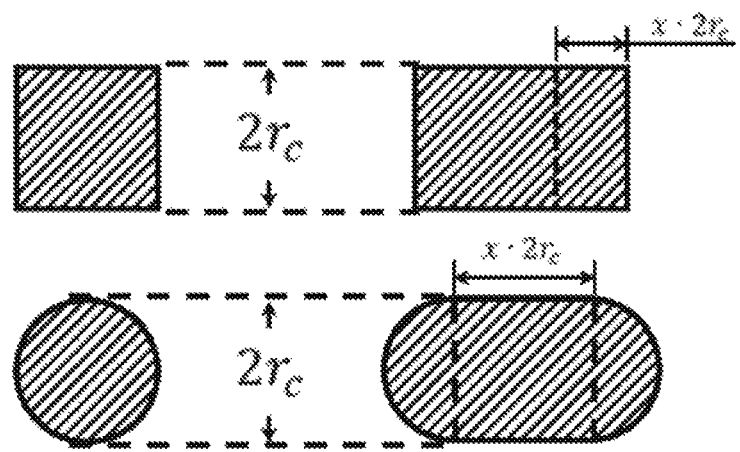
FIG. 4 is a schematic diagram of a lengthened section of a soft magnetic ferrite middle column.

In an actual application, if the length of the inductor is larger than the width, the soft magnetic ferrite middle column in the present invention can be lengthened along the length direction of the inductor for avoiding waste of a space. As shown in FIG. 4, assuming that the section of the soft magnetic ferrite middle column is lengthened from the square to a rectangle, a length increased in the length direction is as follows:

$$x \cdot 2r_c (x>0),$$

while the width is still kept at $2r_c$. It can be seen that the sectional area of the soft magnetic ferrite middle column is as follows:

$$(1+x) \cdot 2r_c \cdot 2r_c$$

while the perimeter of the soft magnetic ferrite middle column is as follows:

$$8r_c+2x\cdot 2r_c,$$

then the sectional area of the magnetic powder glue can be expressed as:

$$(8+4x)\cdot r_c\cdot h.$$

Then, as long as a relationship is met as follows:

$$r_c\geq 3h,$$

the sectional area of the soft magnetic ferrite middle column can also meet the condition of being more than 1.5 times that of the sectional area of the magnetic powder glue. The reason is that the sectional area of the magnetic powder glue is in direct proportion to the perimeter of the soft magnetic ferrite middle column, while when the shape of the soft magnetic ferrite middle column is lengthened from the square to the rectangle, an increase speed of the sectional area of the ferrite middle column is higher than an increase speed of the perimeter of the ferrite middle column.

Moreover:

$$Ae\cdot Aw/Le=(8+4x)\cdot r_c\cdot d\cdot h\cdot (H-2h)/(2d+H)$$

that is, the optimal value condition still can be deduced to meet a relationship as follows:

$$r_c>d.$$

In other words, as long as a width of a rectangular section of the ferrite middle column is correspondingly $2r_c$, the related optimal value condition is still the same.

As shown in FIG. 4, assuming that the section of the ferrite middle column is lengthened from a circle to a race track, a length increased in the length direction is as follows:

$$x\cdot 2r_c(x>0),$$

while the width is still kept at a diameter $2r_c$ of the circle. It can be seen that the sectional area of the soft magnetic ferrite middle column is as follows:

$$x\cdot 2r_c\cdot 2r_c+\pi\cdot r_c^2,$$

while the perimeter of the soft magnetic ferrite middle column is as follows:

$$2x\cdot 2r_c+2\pi\cdot r_c$$

then the sectional area of the magnetic powder glue can be expressed as:

$$(2\pi+4x)\cdot r_c\cdot h$$

then as long as a relationship is met as follows:

$$r_c\geq 3h,$$

the sectional area of the soft magnetic ferrite middle column can also meet the condition of being more than 1.5 times that of the sectional area of the magnetic powder glue. The reason is that the sectional area of the magnetic powder glue is in direct proportion to the perimeter of the soft magnetic ferrite middle column, while when the shape of the soft magnetic ferrite middle column is lengthened from the circle to the race track, an increase speed of the sectional area of the ferrite middle column is higher than an increase speed of the perimeter of the ferrite middle column. Moreover:

$$Ae\cdot Aw/Le=(2\pi+4x)\cdot r_c\cdot d\cdot h\cdot (H-2h)/(2d+H)$$

that is, the optimal value condition still can be deduced to meet a relationship as follows:

$$r_c>d.$$

In other words, as long as a width of a race track shaped section of the ferrite middle column is correspondingly $2r_c$, the related optimal value condition is still the same.

It can be seen from the above that as long as a width $2r_c$ of the section of the soft magnetic ferrite middle column perpendicular to the height direction of the inductor needs to be more than 0.4 time that of the width 2W of the inductor, lengthening of the section may not change advantages of the design on the direct-current saturation characteristic and the direct-current resistance. The shape of the section of the soft magnetic ferrite middle column perpendicular to the height direction of the power inductor comprises but not limited to the circle, the square, the rectangle and the race track.

Meanwhile, it is considered that the ferrite middle column must be arranged in a centrosymmetric position of the inductor, that is, the ferrite middle column must be simultaneously arranged in a centrosymmetric position of the length-width direction and the height direction, so that a better direct-current saturation characteristic is easily obtained, and a partial saturation problem caused by asymmetry is difficult to appear. Materials of the soft magnetic ferrite middle column comprise manganese zinc ferrite and nickel zinc ferrite; the magnetic powder glue is formed by mixing resin and magnetic metal powder; materials of the resin material comprise but not limited to epoxy resin, silicone resin, phenolic resin and the like; and materials of the magnetic metal powder comprise but not limited to carbonyl iron, iron-silicon alloy, iron-silicon-aluminum alloy, iron-silicon-chromium alloy, iron-nickel alloy, iron-nickel-molybdenum alloy, amorphous alloy, and the like. Since the magnetic powder glue in the present invention encapsulates the coil winding and the soft magnetic ferrite middle column in an injection molding manner, the magnetic permeability of the magnetic powder glue cannot be higher than 20. If the magnetic permeability is too high, the magnetic powder glue is poor in fluidity and is unfavorable for a manufacturing procedure of the injection molding. Meanwhile, the magnetic permeability of the magnetic powder glue cannot be less than 5, and if the magnetic permeability is too small, the inductor may have a higher direct-current resistance. It can be seen from the above deduction that, the winding window height $h_w$ of the coil winding cannot be greater than the height $h_c$ of the soft magnetic ferrite middle column. If the winding window height $h_w$ of the coil winding is too large, the yoke position thickness h of the magnetic powder glue may be decreased, and then the magnetic flux of the soft magnetic ferrite middle column will be hindered. Preferably, the winding window height $h_w$ of the coil winding should be equal to the height $h_c$ of the ferrite middle column. The inductor may further comprise two terminal parts which are welded with the coil winding and provide electrical connection between the inductor and an external circuit.

Since the middle column adopts the soft magnetic ferrite material with a high magnetic permeability in the present invention, compared with a manufacturing procedure of an existing mold-pressing inductor, a magnetic permeability of outer encapsulation can be decreased, thereby easily adopting the manufacturing procedure of the injection molding, reducing molding pressure, increasing production efficiency and reliability and easily realizing automatic production. For the characteristic, a defect of easy saturation of the I-shaped magnetic glue inductor is overcome, and through the dimensional setting of the present invention, a balanced direct-current resistance and a direct-current saturation characteristic can be obtained.

Embodiment 1

A corresponding reference sample in the present embodiment is an I-shaped magnetic glue inductor NR6045-100M. A length, a width and a height of the reference sample are respectively 6 mm·6 mm·4.5 mm. As shown in FIG. 11, an initial induction quantity L of the inductor is 10 uH, saturation current $I_{sat}$ is 3.9 A, direct-current resistance DCR is 47 mΩ, and the saturation current $I_{sat}$ is defined as direct current corresponding to an induction quantity decreased by 30% from the initial induction quantity under a direct-current bias action. The material of the soft magnetic ferrite middle column of the sample in the present embodiment is a manganese zinc ferrite PC40, the radius $r_c$ of the middle column is 1.3 mm, the height $h_c$ is 3.8 mm, a limited dimension condition in the present invention is met, and the soft magnetic ferrite middle column is arranged in a centrosymmetric position of the inductor. Then, the outer part of the middle column is subjected to injection molding encapsulation by adopting the magnetic powder glue, and the magnetic permeability of the magnetic powder glue is 12. It can be seen that, the inductor in the present embodiment can obtain higher saturation current $I_{sat}$ and smaller direct-current resistance DCR under a condition of the same initial induction quantity.

Figure 5:
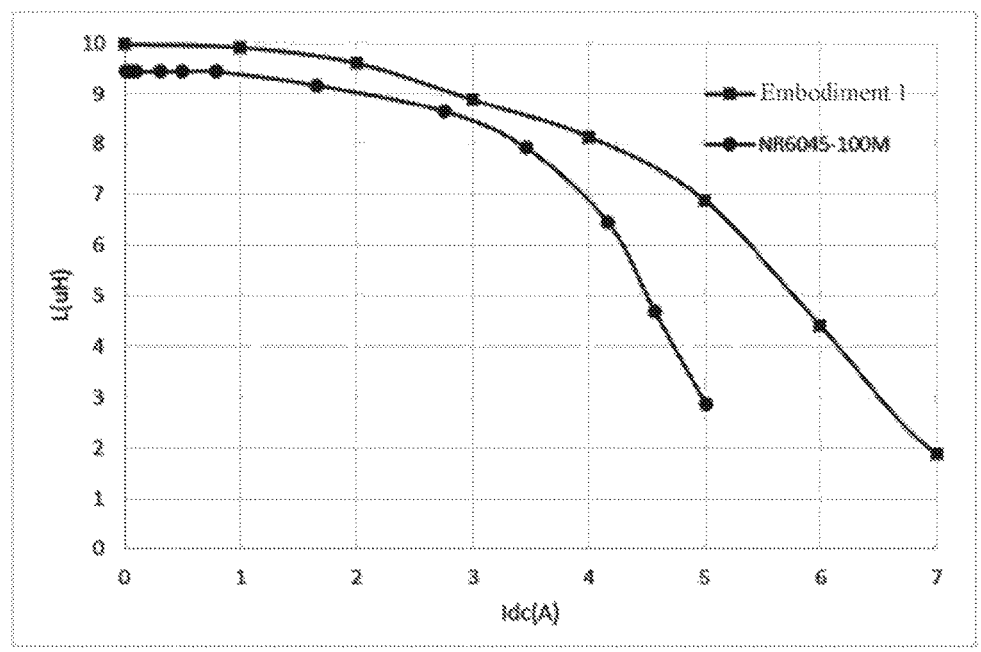
FIG. 5 is a comparison diagram of a direct-current saturation characteristic in embodiment 1.

It can be clearly seen from FIG. 5 that, the saturation current $I_{sat}$ of the present embodiment is higher, the direct-current saturation characteristic is better, which means that higher current can be endured while the magnetic core is not saturated in the actual application. Relative to an inductor with a thicker size, since the length of middle column with high magnetic permeability has high ratio in the whole magnetic circuit length and the corresponding magnetic glue is molded in an injection molding manner rather than a gluing manner in the present invention, a higher magnetic permeability can be obtained. The two factors determine that the present invention has extremely small direct-current resistance relative to an NR magnetic glue inductor. Similarly, since the present embodiment follows the above dimensional limit condition, an excellent direct-current saturation characteristic can be obtained.

Figure 6:
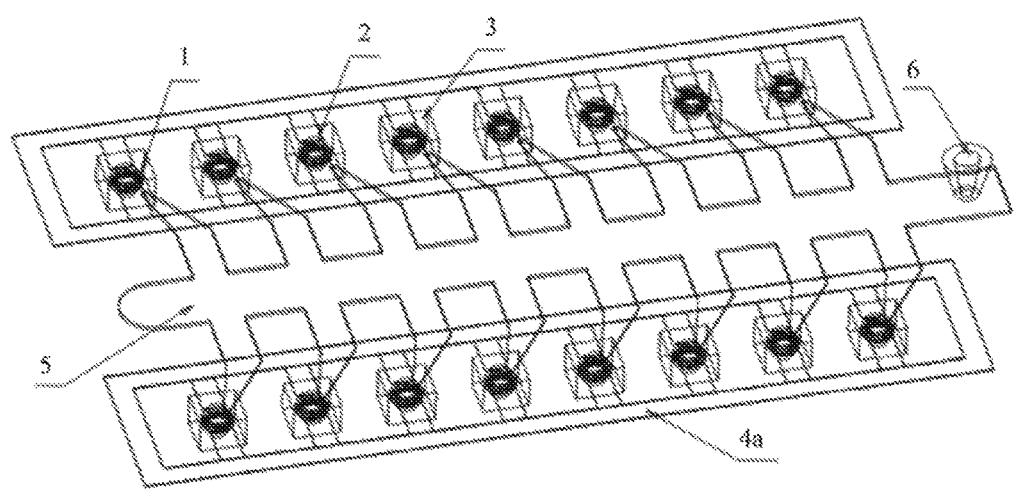
FIG. 6 is a schematic diagram of injection molding encapsulation of a power inductor in the present invention.
Figure 7:
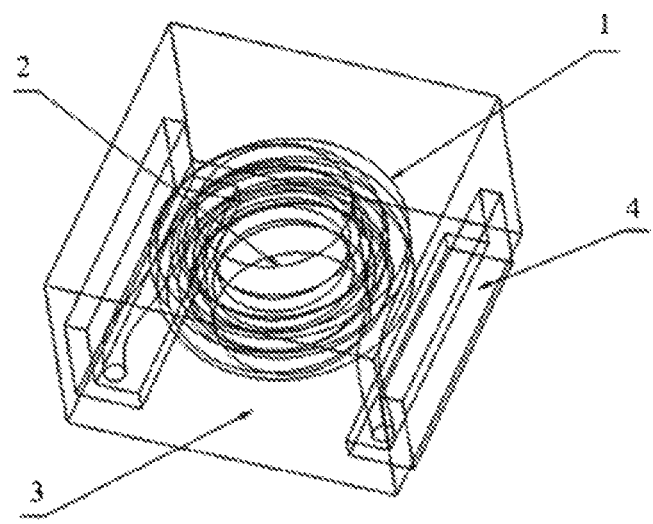
FIG. 7 is a schematic diagram of a power inductor after completion of injection molding encapsulation in the present invention.

In the aspect of the manufacturing procedure, as shown in FIG. 6, iron-silicon-chromium metal magnetic powder is mixed with epoxy resin firstly, the mixed magnetic powder glue is fed into a heated charging barrel from a hopper of an injection molding machine, heated and molten into a flow shape, and then passes through a nozzle 6 at an end of the charging barrel by virtue of push of a plunger or a screw and then is injected into a closed mold at a low temperature through a runner 5. A coil put in a central position of the mold, and the soft magnetic ferrite middle column 2 are encapsulated together by using the magnetic powder glue 3, while a lead frame 4a connected with the coil is not encapsulated by the magnetic powder glue 3 since the lead frame 4a is put outside a mold cavity. After several stages such as pressure maintaining, cooling and demolding, the magnetic powder glue is cured, and then an inductor body with high strength can be formed. The lead frame 4a is subjected to manufacturing procedures such as punching, bending and the like to form the two terminal parts. Certainly, the two terminal parts can be directly put into the die cavity together with the coil and the ferrite middle column and encapsulated by the magnetic powder glue without using the lead frame. FIG. 7 is a schematic diagram of an inductor after completion of encapsulation, that is, the inductor comprises a coil winding 1, the soft magnetic ferrite middle column 2, the magnetic powder glue 3 and the two terminal parts 4. The inductor subjected to injection molding encapsulation has excellent strength and hardness, and a requirement of drop impact resistance can be well met; and moreover, through encapsulation by the magnetic powder glue, the inductor has an excellent anti-electromagnetic interference function. Due to excellent fluidity of the magnetic powder glue for injection molding, many inductors can be molded at a time due to a good design of a mold runner, thereby increasing production efficiency. Meanwhile, due to the excellent fluidity of the powder glue, potential damage to the coil winding caused by the injection molding is decreased, and reliability of the manufacturing procedure of the inductor is increased. It should be noted that the process disclosed in this embodiment can be implemented in a very similar process, such as transfer molding, pressure casting and hot pressing, which does not mean that the process is beyond the scope of protection of the present invention.

Embodiment 2

A reference sample in the present embodiment is an integrally molded mold-pressing inductor in the prior art. A length, a width and a height of the reference sample are respectively 7 mm·6.6 mm·3 mm. As shown in FIG. 12, an initial induction quantity L of the inductor is 10 uH, saturation current $I_{sat}$ is 5.5 A, and direct-current resistance DCR is 68 mΩ. According to a solution of the present invention, the soft magnetic ferrite middle column adopts a nickel-zinc ferrite L20H, a magnetic permeability of the magnetic powder glue for outer encapsulation is 12 u, settings of the radius $r_c$ of the middle column and the height $h_c$ of the middle column are changed, and totally six different inductor design solutions are obtained. Three dimensional limits in the present invention are met in embodiments 2-1 and 2-2, while only one or two in the three dimensional limits in the present invention are met in reference embodiments 2-1, 2-2, 2-3 and 2-4.

Figure 8:
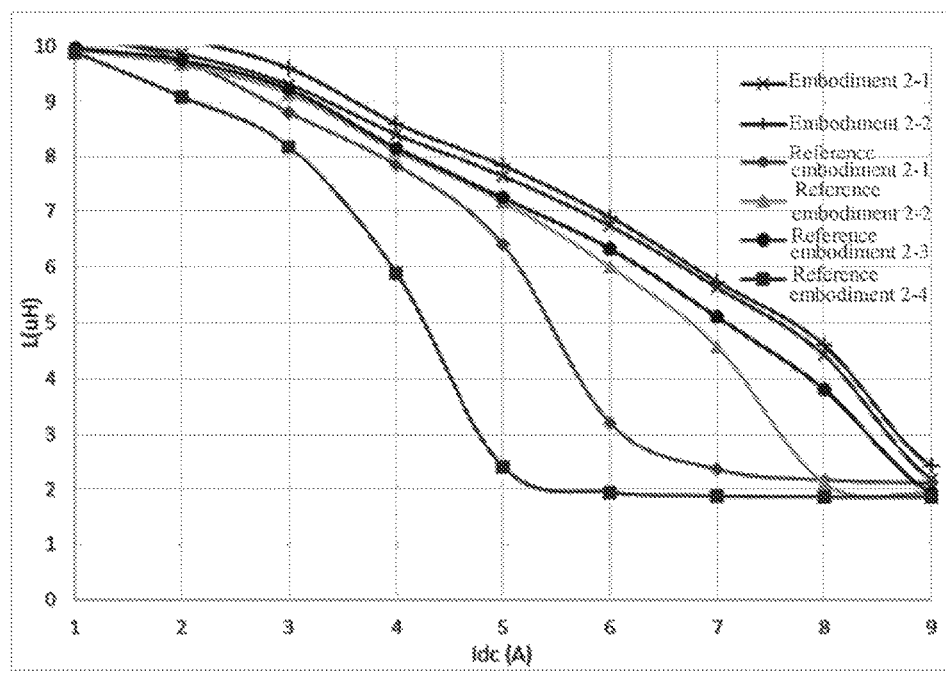
FIG. 8 is a comparison diagram of a direct-current saturation characteristic in embodiment 2.

It can be seen from FIG. 8 and FIG. 12 that, as long as the dimensional limits of the present invention are met, relative to the mold-pressing inductor in the prior art, the inductor in the present invention may maintain a good direct-current superposition saturation characteristic while maintaining small direct-current resistance DCR, and a condition of sudden drop, such as conditions in embodiments 2-1 and 2-2, does not appear. However, if the dimensional limits of the present invention are not met, such as reference embodiment 2-3, although the direct-current superposition saturation characteristic is slightly poor, the direct-current resistance DCR becomes very high; while in reference embodiments 2-1, 2-2 and 2-4, although the direct-current resistance is in a reasonable range, the direct-current superposition saturation characteristic may have a sudden drop sooner or later, indicating that the soft magnetic ferrite middle column has a risk of saturating in advance and a design objective of the present invention cannot be met. It can be seen from the above that, as long as the dimensional limits of the present invention are met, the balanced direct-current resistance and direct-current superposition saturation characteristic can be obtained.

Embodiment 3

Figure 9:
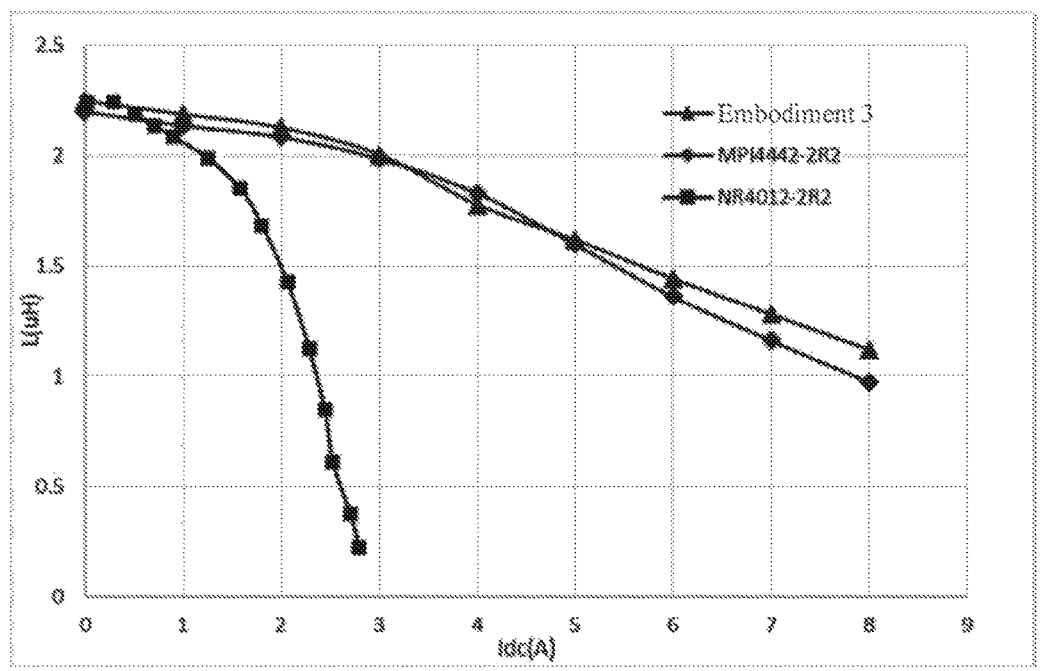
FIG. 9 is a comparison diagram of a direct-current saturation characteristic in embodiment 3.

The present embodiment shows how to achieve a better inductor level in an industry by using convenient manufacturing procedure conditions. Particularly, corresponding reference samples in the present embodiment are thin power inductors, wherein NR4012-2R2 is an I-shaped magnetic glue inductor, and MPI4442-2R2 is a metal powder mold-pressing molding inductor. It can be seen from FIG. 13 that a length, a width and a height of the mold-pressing inductor MPI4442-2R2 are respectively 4.4 mm·4.2 mm·1.2 mm, an initial induction quantity L of the inductor is 2.2 uH, saturation current $I_{sat}$ is 5.3 A, and direct-current resistance DCR is 79.5 mΩ; and a length, a width and a height of the I-shaped magnetic glue inductor NR4012-2R2 are respectively 4.0 mm·4.0 mm·1.2 mm, an initial induction quantity L of the inductor is 2.2 uH, saturation current $I_{sat}$ is 2 A, and direct-current resistance DCR is 92 mΩ. A material of the soft magnetic ferrite middle column of the sample in the present embodiment is a manganese zinc ferrite PC44, the radius $r_c$ of the middle column is 0.9 mm, the height his 0.73 mm, a dimension condition limited in the present invention is met, and the soft magnetic ferrite middle column is arranged in a centrosymmetric position of the inductor. Then, the outer part of the middle column is subjected to injection molding encapsulation by adopting the magnetic powder glue, and the magnetic permeability of the magnetic powder glue is 13. It can be seen that, the inductor in the present embodiment can obtain higher saturation current $I_{sat}$ of 5.6 A and smaller direct-current resistance DCR of 64 mΩ under a condition of the same initial induction quantity. However, the I-shaped magnetic glue inductor has the lowest saturation current $I_{sat}$ and the highest actual direct-current resistance DCR. FIG. 9 is comparison of direct-current saturation characteristics of the present embodiment with the mold-pressing inductor MPI4442 and the I-shaped magnetic glue inductor NR4012. Apparently, relative to the I-shaped magnetic glue inductor, the present embodiment and the mold-pressing inductor have excellent direct-current saturation characteristics. According to embodiments designed according to conditions of the present invention, the direct-current resistance is greatly decreased under a condition that an excellent direct-current saturation characteristic is ensured, indicating that advantages of the present invention are very obvious in case of inductance flattening.

Embodiment 4

Figure 10:
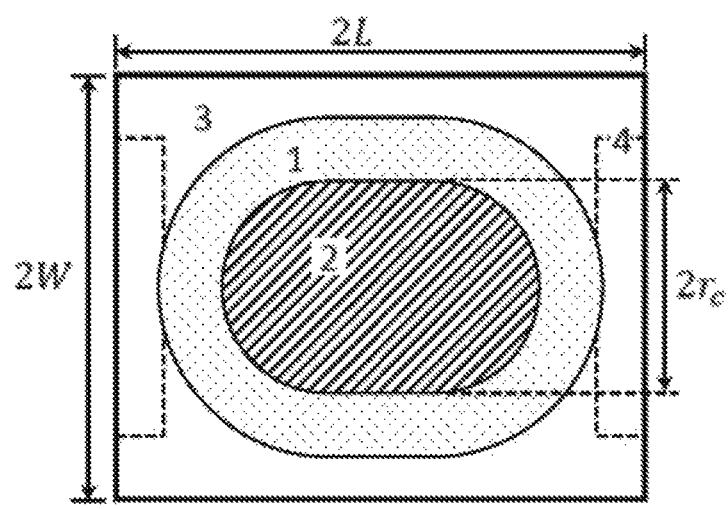
FIG. 10 is a sectional view of a height direction of a power inductor in embodiment 4.

A length 2L and a width 2W of a power inductor involved in the present embodiment are respectively 2.5 mm and 2.0 mm, and a maximum height H of the power inductor is 1.2 mm. Since the length of the inductor in the present embodiment is greater than the width, a shape of a section of the soft magnetic ferrite middle column is designed as a race track in order to effectively utilize a space in a length direction of the inductor. FIG. 10 is a sectional view of a height direction of the power inductor. The power inductor comprises the coil winding 1, the soft magnetic ferrite middle column 2, the magnetic powder glue 3 and the two terminal parts 4. The material of the soft magnetic ferrite middle column 2 is a nickel-zinc ferrite L20H, a width $2r_c$ of a race track shaped section of the soft magnetic ferrite middle column is 1 mm, a length of the race track shaped section of the soft magnetic ferrite middle column is 1.5 mm, and a height $h_c$ of the soft magnetic ferrite middle column along the height direction of the inductor is 0.9 mm. It can be seen that, the width $2r_c$ of the section of the ferrite middle column is more than 0.4 time of the width 2W of the inductor, and the height $h_c$ of the ferrite middle column 2 is more than H/2 and not less than H−$2r_c$/3. The winding 1 is wound by a flat type copper wire, and an outer part of the winding is subjected to injection molding encapsulation by adopting the magnetic powder glue 3 with a magnetic permeability of 12. Finally, the power inductor designed by the present invention has a direct-current resistance DCR of 34.5 mΩ, an initial induction quantity of 0.47 uH, and a saturation current $I_{sat}$ of 6 A that decreases the initial induction quantity by 30%. Compared with an existing mold-pressing inductor, the direct-current resistance DCR of the inductor under a same specification is 35 mΩ, the saturation current $I_{sat}$ is 4.7 A, the direct-current resistance DCR of the two inductors is close to each other, while the saturation current $I_{sat}$ in the present embodiment is better; and moreover, compared with a common mould pressing manufacturing procedure of the specification, advantages of the injection molding encapsulation of the present invention in the aspect of the manufacturing procedure are apparent.

Description of preferred embodiments is provided above, so that the present invention can be used or utilized by any of those skilled in the art. Various modifications to these embodiments are apparent to those skilled in the art, and a general principle described herein can be applied to other embodiments without using creativeness. Therefore, the present invention is not limited to embodiments illustrated herein and should conform to a widest scope consistent with principles and new features disclosed herein.

What is claimed is:

1. A power inductor encapsulated through injection molding, comprising a coil winding, a soft magnetic ferrite middle column inserted in a middle of the coil winding, and a magnetic powder glue for encapsulating the coil winding and the soft magnetic ferrite middle column through injection molding; wherein the power inductor is square and meets:

$L \geq W$ $2r_c > 0.4 \times 2W$, wherein a section width of the soft magnetic ferrite middle column perpendicular to a height direction of the inductor is $2r_c$, a length of the power inductor is 2L, and a width of the power inductor is 2W;

$4H/5 > h_c > H/2$ wherein, $h_c$ is a height of the soft magnetic ferrite middle column along the height direction of the power inductor, and a height of the power inductor is H; and $h_c \geq H - 2r_c/3$.

2. The power inductor encapsulated through injection molding according to claim 1, wherein the soft magnetic ferrite middle column is arranged in a centrosymmetric position of the power inductor.

3. The power inductor encapsulated through injection molding according to claim 2, wherein a section shape of the soft magnetic ferrite middle column perpendicular to the height direction of the power inductor comprises a circle, a square, a rectangle and a race track.

4. The power inductor encapsulated through injection molding according to claim 3, wherein materials of the soft magnetic ferrite middle column comprise manganese zinc ferrite and nickel zinc ferrite.

5. The power inductor encapsulated through injection molding according to claim 4, wherein the magnetic powder glue is formed by mixing resin and magnetic metal powder; materials of the resin comprise epoxy resin, silicone resin and phenolic resin; and materials of the magnetic metal powder comprise carbonyl iron, iron-silicon alloy, iron-silicon-aluminum alloy, iron-silicon-chromium alloy, iron-nickel alloy, iron-nickel-molybdenum alloy and amorphous alloy.

6. The power inductor encapsulated through injection molding according to claim 5, wherein a magnetic permeability of the magnetic powder glue is more than or equal to 5 and less than or equal to 20.

7. The power inductor encapsulated through injection molding according to claim 6, wherein a winding window height $h_w$ of the coil winding is less than or equal to $h_c$.

8. The power inductor encapsulated through injection molding according to claim 1, wherein the power inductor further comprises two terminal parts, and the two terminal parts are welded with the coil winding and provide electrical connection between the power inductor and an external circuit.

* * * * *